United States Patent
Mody

(10) Patent No.: US 10,984,444 B2
(45) Date of Patent: Apr. 20, 2021

(54) SYSTEMS AND METHODS FOR GENERATING INTELLIGENT ACCOUNT RECONFIGURATION OFFERS

(71) Applicant: Dropbox, Inc., San Francisco, CA (US)

(72) Inventor: Viraj Mody, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 767 days.

(21) Appl. No.: 14/035,173

(22) Filed: Sep. 24, 2013

(65) Prior Publication Data

US 2015/0088646 A1 Mar. 26, 2015

(51) Int. Cl.
*G06Q 30/02* (2012.01)

(52) U.S. Cl.
CPC .............. *G06Q 30/0255* (2013.01)

(58) Field of Classification Search
CPC ................................................. G06Q 30/0255
See application file for complete search history.

(56) References Cited

U.S. PATENT DOCUMENTS

| | | | |
|---|---|---|---|
| 7,251,618 B2 | 7/2007 | Petersen | |
| 7,743,001 B1 | 6/2010 | Vermeulen et al. | |
| 8,244,559 B2 | 8/2012 | Horvitz et al. | |
| 2002/0147733 A1 | 10/2002 | Gold et al. | |
| 2004/0225659 A1 | 11/2004 | O'Brien et al. | |
| 2012/0022910 A1* | 1/2012 | Chi | G06F 9/5072 705/7.22 |
| 2012/0102224 A1 | 4/2012 | Mercuri | |
| 2013/0054426 A1* | 2/2013 | Rowland | G06F 9/5072 705/27.2 |
| 2013/0091282 A1 | 4/2013 | Tontiruttananon et al. | |
| 2013/0275669 A1* | 10/2013 | Naga | H04L 67/2857 711/113 |
| 2014/0164938 A1* | 6/2014 | Petterson | G06F 3/0482 715/739 |
| 2014/0201848 A1* | 7/2014 | Kulkarni | G06F 21/6218 726/27 |
| 2014/0222819 A1* | 8/2014 | Dies | G06F 16/353 707/740 |

OTHER PUBLICATIONS

Bao Xianqiang; Xiao Nong; Shi Weisong; Liu Fang; Mao Huajian; Zhang Hang, "SyncViews: Toward Consistent User Views in Cloud-Based File Synchronization Services", Chinagrid Conference (ChinaGrid), 2011 Sixth Annual, Aug. 22-23, 2011, p. 89-96, ISBN: 978-1-4577-0885-5; DOI: 10.1109/ChinaGrid.2011.35

* cited by examiner

*Primary Examiner* — David J Stoltenberg
*Assistant Examiner* — Michael J Cross
(74) *Attorney, Agent, or Firm* — Hickman Becker Bingham Ledesma LLP

(57) ABSTRACT

Embodiments are provided for generating intelligent account reconfiguration offers to users of a content management system. The content management system may monitor how a user utilizes available features and/or storage space to determine whether the user would be amenable to an offer to reconfigure their user account. Such account reconfiguration offers may include an offer to alter the amount of storage space and/or features available to the user account. The storage space and/or features offered as part of an intelligent account reconfiguration offer may be specific to one particular type of content category, or, for example, may be a function of activity in multiple content categories, based on analysis of historical user data across the entire content management system.

21 Claims, 9 Drawing Sheets

Storage and Activity Thresholds

| | Storage Utilization | Total Viewing Time | Total Number of Shares | Regularity | Total Number of Distinct Files Accessed | Total Number of File Interactions |
|---|---|---|---|---|---|---|
| Documents | 2GB | 15hr | 10 | 3x/week | 10 | 20 |
| Photographs | 4GB | 4hr | 50 | 3x/week | 50 | 100 |
| Music | 20GB | 15hr | 50 | 4x/week | 50 | 100 |
| Videos | 25GB | 40hr | 10 | 3x/week | 15 | 20 |
| Recipies | 10MB | 3.5hr | 15 | 5x/week | 15 | 40 |
| Guitar Tabs | 10MB | 10hr | 15 | 2x/week | 20 | 50 |
| Total | 40GB | 20hr | 25 | 4x/week | 50 | 100 |

FIG. 4

SYSTEMS AND METHODS FOR GENERATING INTELLIGENT ACCOUNT RECONFIGURATION OFFERS

FIELD OF THE INVENTION

Various embodiments disclosed herein relate generally to generating intelligent account reconfiguration offers.

BACKGROUND

Economies of scale and increases in the availability of high-speed network connections have made it both inexpensive and convenient for users to store digital content in a variety of remote storage systems instead of, or in addition to, storing content on user devices. Storing content "in the cloud" provides users with redundancy, the ability to easily share such content, and the ability to maintain "master copies" that can be synchronized to multiple user devices. Besides simply storing users' data, such remote storage systems can offer various content management solutions to improve the user experience.

SUMMARY

Systems and methods are provided for generating intelligent account reconfiguration offers, which may be based on how a user utilizes a content management system. A determination that a user has begun or may begin to use new features of the content management system, has increased or decreased usage of previously-used features, and/or has approached a system-wide or category-specific storage quota, for example, may trigger the generation of appropriately tailored account reconfiguration offers.

In some embodiments, a processor associated with a content management system may determine that a usage level associated with a particular user account of the content management system is within a predetermined range of an established threshold. The usage level and established threshold may represent any measurable statistics relating to a user's utilization of the content management system's resources and/or features. The processor can also determine that utilization in a particular content category of the user account is at least partially responsible for the usage level falling within the predetermined range and generate an account reconfiguration offer for the user account based on the particular content category. Thus, intelligent offers can be generated based on a determination of how a user utilizes the content management system.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 4 depicts a table of illustrative storage and activity thresholds for generating intelligent account reconfiguration offers based on utilization across different content categories of a content management system, in accordance with some embodiments;

DETAILED DESCRIPTION OF THE DISCLOSURE

Methods, systems, and computer readable mediums for generating intelligent account reconfiguration offers are presented. For purposes of description and simplicity, methods, systems and computer readable mediums will be described for a content storage and management service, and in particular, content item classification. However, the terms "content storage service" and "content management system" are used herein to refer broadly to a variety of applications, storage providers, and management service providers that can handle a wide variety of types of content, files, portions of files, and/or other types of data. Those with skill in the art will recognize that the methods, systems, and mediums described may be used for a variety of applications, storage providers/services and types of content, files, portions of files, and/or other types of data.

Figure 1:
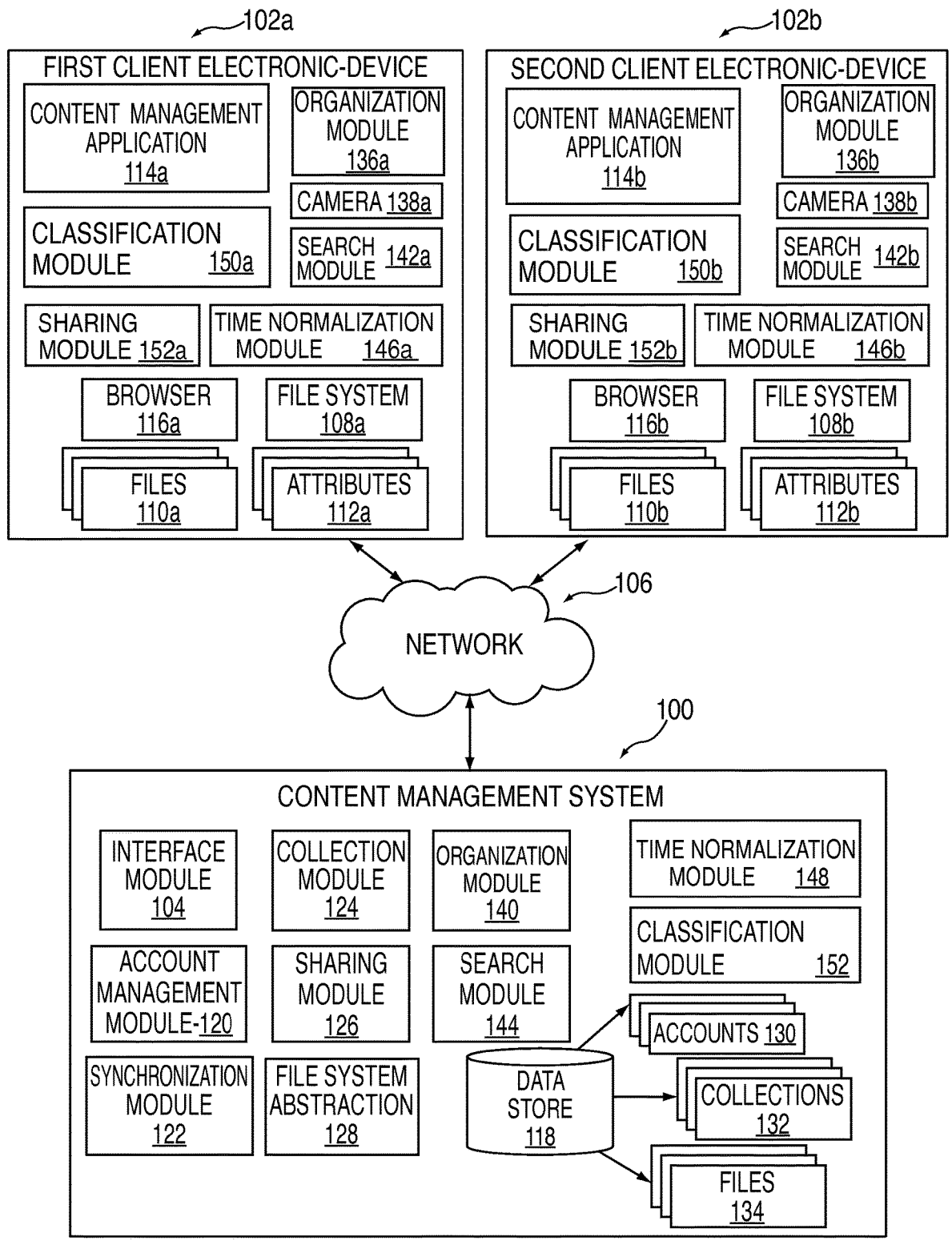
FIG. 1 depicts a schematic view of an exemplary content management system for generating intelligent account reconfiguration offers, in accordance with some embodiments of the invention.

FIG. 1 depicts a schematic view of an exemplary content management system for generating intelligent account reconfiguration offers in accordance with some embodiments of the invention. Elements in FIG. 1, including, but not limited to, first client electronic device 102a, second client electronic device 102b, and content management system 100 may communicate by sending and/or receiving data over network 106. Network 106 may be any network, combination of networks, or network devices that may carry data communication. For example, network 106 may be any one or any combination of LAN (local area network), WAN (wide area network), telephone network, wireless network, point-to point network, star network, token ring network, hub network, or any other configuration.

Network 106 may support any number of protocols, including, but not limited, to TCP/IP (Transfer Control Protocol and Internet Protocol), HTTP (Hypertext Transfer Protocol), and WAP (Wireless Application Protocol). For example, first client electronic device 102a and second client electronic device 102b (collectively 102) may communicate with content management system 100 using TCP/IP and, at a higher level, use browser 116 to communicate with a web server (not shown) at content management system 100 using HTTP. Exemplary implementations of browser 116 can include, but are not limited to, Google Inc. Chrome™ browser, Microsoft Internet Explorer®, Apple Safari®, Mozilla Firefox, and Opera Software Opera.

A variety of client electronic devices 102 may communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118).

In some embodiments, a client electronic device may be permitted to access, modify, and/or manage files that were originally uploaded to data store 118 by another client electronic device. For example, client electronic device 102a may access file 110b stored remotely with data store 118 and may or may not store file 110b locally within file system 108a on client electronic device 102a depending, for example, on sharing permissions defined for the files. Continuing with the example, client electronic device 102a may temporarily store file 110b within a cache (not shown) locally within client electronic device 102a, make revisions to file 110b, and communicate the revisions to file 110b to data store 118. Optionally, a local copy of the file may be stored on client electronic device 102a (e.g., in files 110a).

Client electronic devices 102 may include a camera 138 (e.g., cameras 138a and 138b) to capture and record digital images and/or videos, which may be stored locally in files 110. Additionally, camera 138 may store metadata with the images along with the images and/or videos captured by camera 138. Such metadata may include, for example, creation time timestamp, geolocation, orientation, rotation, title, and/or any other attributes or data relevant to the captured image.

Metadata values may be stored within attribute 112 as name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

A time normalization module 146 (e.g., organization modules 146a and 146b) may be used to normalize dates and times stored with a content item. An example of time normalization is provided in U.S. patent application Ser. No. 13/888,118, entitled "Date and Time Handling," filed on May 6, 2013, which claims the benefit of U.S. Provisional Patent Application No. 61/801,318, entitled "Date and Time Handling," filed on Mar. 15, 2013, each of which is incorporated by reference herein in its entirety. Time normalization module 146, resident on client electronic device 102, counterpart time normalization module 148, resident on content management system 100, and/or any combination thereof may be used to normalize dates and times stored for content items. The normalized times and dates may be used to sort, group, cluster, perform comparisons between, and/or perform basic math function on content items.

An organization module 136 (e.g., organization modules 136a and 136b) may be used to organize content items into clusters, organize content items to provide samplings of content items for display within user interfaces, and/or retrieve organized content items for presentation. An example of such an organization module is described in U.S. patent application Ser. No. 13/888,186, entitled "Presentation and Organization of Content," filed on May 6, 2013, which claims the benefit of U.S. Provisional Patent Application No. 61/794,184, entitled "Presentation and Organization of Content," filed on Mar. 15, 2013, each of which is incorporated by reference herein in its entirety.

Organization module 136 may utilize any suitable clustering algorithm identify and organize similar content items into clusters. Such clusters may facilitate organized presentation of content items within user interfaces displayed client electronic devices 102 and content management system 100. In some embodiments, similarity rules may be defined to create one or more numeric representations embodying information regarding similarities between each of the content items. Organization module 136 may use the numeric representations as references for similarity between content items in order to cluster the content items.

In some embodiments, content items may be organized into clusters to aid with retrieval of similar content items in response to search requests. For example, organization module 136a may identify that two images are similar and group the images together in a cluster. Organization module 136a may process content items to determine clusters independently or in conjunction with a counterpart organization module (e.g., organization module 140 and/or 136b). In other embodiments, organization module 136a may only provide clusters identified with counterpart organization modules for presentation. Continuing with the example, processing of content items to determine clusters may be an iterative process executed upon receipt of new content items and/or new similarity rules.

In some embodiments, a search module 142 on client device 102 can be provided with counterpart search module 144 on content management system 100 to support content item searches. A search request may be received by search module 142 and/or 144 that requests a content item. In some embodiments, the search may be handled by searching metadata and/or attributes 112 associated with content items during the provision of management services. For example, cluster markers stored with images may be used to find images by date. In particular, cluster markers may indicate an approximate time or average time for the images stored with the cluster marker in some embodiments, and the markers may be used to speed the search and/or return the search results with the contents of the cluster with particular cluster markers.

Files 110 managed by content management system 100 may be stored locally within file system 108 of client electronic devices 102 and/or stored remotely within data store 118 of content management system 100 (e.g., files 134 in data store 118). Content management system 100 may provide synchronization of files managed by content management system 100. Attributes 112a and 112b (collectively 112) or other metadata may also be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, attributes 112 can include a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104 and accessible modules for device 102. Web browser 116a and 116b (collectively 116) may be used to display a web page front end for a client application that may provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 120 may interact with any number of other modules of content management system 100.

An account may be used to store content, such as documents, text files, audio files, video files, etc., from one or more client devices 102 authorized on the account. The content may also include folders of various types with different behaviors, or other mechanisms of grouping content items together. For example, an account may include a public folder that is accessible to any user. The public folder may be assigned a web-accessible address. A link to the web-accessible address may be used to access the contents of the public folder. In another example, an account may include a photos folder that is intended for photos and that provides specific attributes and actions tailored for photos; an audio folder that provides the ability to play back audio files and perform other audio related actions; or other special purpose folders. An account may also include shared folders or group folders that are linked with and available to multiple user accounts. The permissions for multiple users may be different for a shared folder.

Content items (e.g., files 110) may be stored in data store 118. Data store 118 may be a storage device, multiple storage devices, or a server. Alternatively, data store 118 may be cloud storage provider or network storage accessible via one or more communications networks. Content management system 100 may hide the complexity and details from client devices 102 by using a file system abstraction 128 (e.g., a file system database abstraction layer) so that client devices 102 do not need to know exactly where the content items are being stored by the content management system 100. Embodiments may store the content items in the same folder hierarchy as they appear on client device 102. Alternatively, content management system 100 may store the content items in various orders, arrangements, and/or hierarchies. Content management system 100 may store the content items in a network accessible storage (SAN) device, in a redundant array of inexpensive disks (RAID), etc. Content management system 100 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a file system, or any other collection of data. In one variation, each content item stored in data store 118 may be assigned a system-wide unique identifier.

Data store 118 may decrease the amount of storage space required by identifying duplicate files or duplicate chunks of files. Instead of storing multiple copies, data store 118 may store a single copy of a file 134 and then use a pointer or other mechanism to link the duplicates to the single copy. Similarly, data store 118 may store files 134 more efficiently, as well as provide the ability to undo operations, by using a file version control that tracks changes to files, different versions of files (including diverging version trees), and a change history. The change history may include a set of changes that, when applied to the original file version, produce the changed file version.

Content management system 100 may be configured to support automatic synchronization of content from one or more client devices 102. The synchronization may be platform independent. That is, the content may be synchronized across multiple client devices 102 of varying type, capabilities, operating systems, etc. For example, client device 102a may include client software, which synchronizes, via a synchronization module 122 at content management system 100, content in client device 102 file system 108 with the content in an associated user account. In some cases, the client software may synchronize any changes to content in a designated folder and its sub-folders, such as new, deleted, modified, copied, or moved files or folders. In one example of client software that integrates with an existing content management application, a user may manipulate content directly in a local folder, while a background process monitors the local folder for changes and synchronizes those changes to content management system 100. In some embodiments, a background process may identify content that has been updated at content management system 100 and synchronize those changes to the local folder. The client software may provide notifications of synchronization operations, and may provide indications of content statuses directly within the content management application. Sometimes client device 102 may not have a network connection available. In this scenario, the client software may monitor the linked folder for file changes and queue those changes for later synchronization to content management system 100 when a network connection is available. Similarly, a user may manually stop or pause synchronization with content management system 100.

A user may also view or manipulate content via a web interface generated and served by user interface module 104. For example, the user may navigate in a web browser to a web address provided by content management system 100. Changes or updates to content in the data store 118 made through the web interface, such as uploading a new version of a file, may be propagated back to other client devices 102 associated with the user's account. For example, multiple client devices 102, each with their own client software, may be associated with a single account and files in the account may be synchronized between each of the multiple client devices 102.

Content management system 100 may include sharing module 126 for managing sharing content and/or collections of content publicly or privately. Sharing module 126 may manage sharing independently or in conjunction with counterpart sharing module (e.g., 152a and 152b). Sharing content publicly may include making the content item and/or the collection accessible from any computing device in network communication with content management system 100. Sharing content privately may include linking a content item and/or a collection in data store 118 with two or more user accounts so that each user account has access to the content item. The sharing may be performed in a platform independent manner. That is, the content may be shared across multiple client devices 102 of varying type, capabilities, operating systems, etc. The content may also be shared across varying types of user accounts. In particular, the sharing module 126 may be used with the collections module 124 to allow sharing of a virtual collection with another user or user account. A virtual collection may be a grouping of content identifiers that may be stored in various locations within file system of client device 102 and/or stored remotely at content management system 100.

The virtual collection for an account with a file storage service is a grouping of one or more identifiers for content items (e.g., identifying content items in storage). An example of virtual collections is provided in U.S. Provisional Patent Application No. 61/750,791, entitled "Presenting Content Items in a Collections View," filed on Jan. 9, 2013, and herein incorporated by reference in its entirety. The virtual collection is created with the collection module 124 by selecting from existing content items stored and/or managed by the file storage service and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item file to a directory) the content item in another location within data storage in order to place the content item in the collection.

In some embodiments, content management system 100 may be configured to maintain a content directory or a database table/entity for content items where each entry or row identifies the location of each content item in data store 118. In some embodiments, a unique or a nearly unique content identifier may be stored for each content item stored in the data store 118.

Metadata may be stored for each content item. For example, metadata may include a content path that may be used to identify the content item. The content path may include the name of the content item and a folder hierarchy associated with the content item (e.g., the path for storage locally within a client device 102). In another example, the content path may include a folder or path of folders in which the content item is placed as well as the name of the content item. Content management system 100 may use the content path to present the content items in the appropriate folder hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator (URL), which allows any web browser to access the content in content management system 100 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be transmitted to content management system 100 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be transmitted to content management system 100 which may use the received content identification data to identify the appropriate content entry or database row and return the content item associated with the content entry or database row.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or false to indicate that a URL to the content item has not been created. Sharing module 126 may be configured to change the value of the flag to 1 or true after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This allows a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Figure 2:
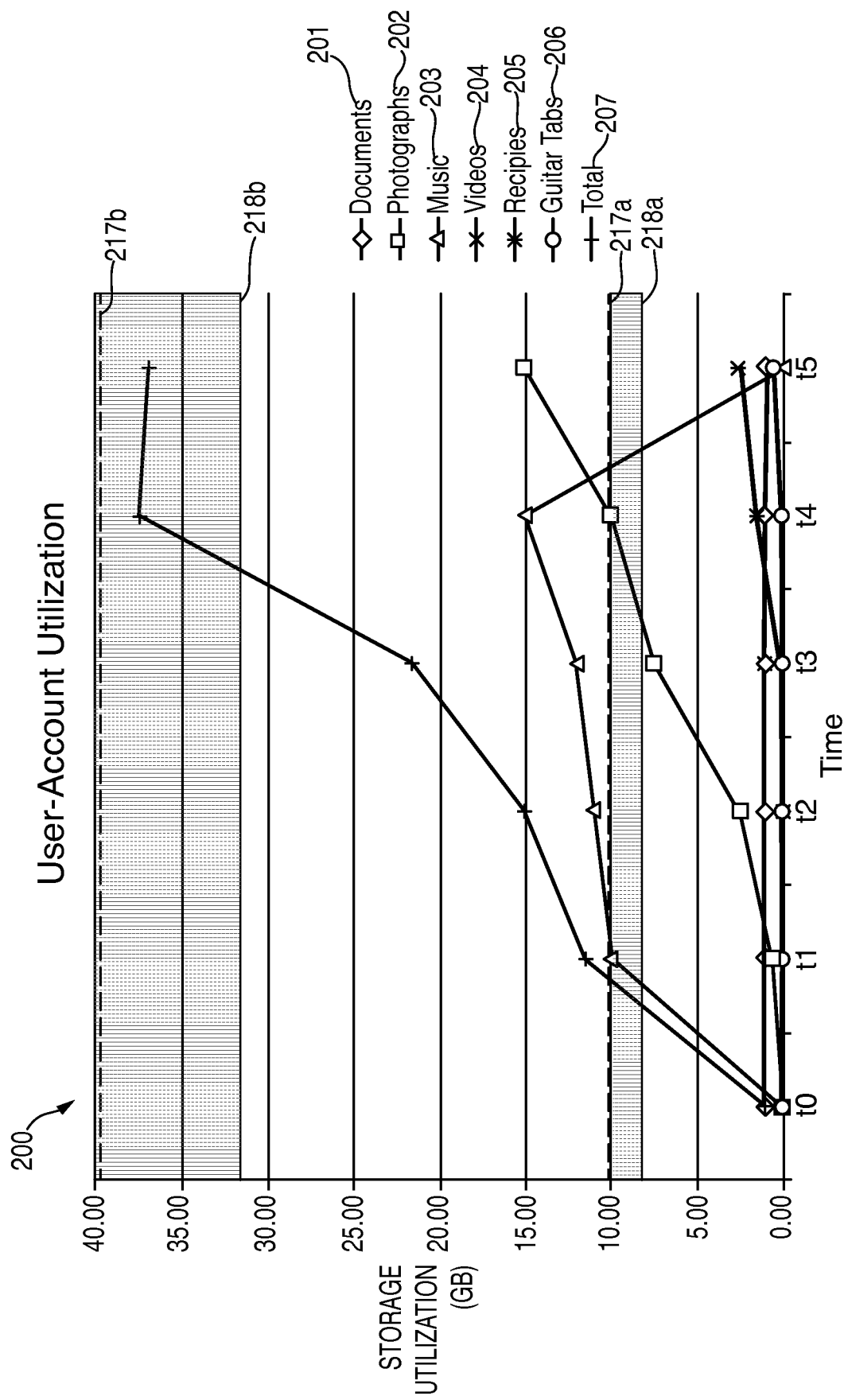
FIG. 2 depicts a line chart illustrating user-account storage utilization over time, in accordance with some embodiments.

FIG. 2 depicts an exemplary line chart 200 illustrating user-account storage utilization over time, in accordance with some embodiments. Line chart 200 can represent storage utilization by content category for a user account registered on a content management system (e.g., content management system 100 of FIG. 1). Although exemplary content categories, including documents 201, photographs 202, music 203, videos 204, recipes 205, guitar tablatures (tabs) 206, and total 207, are depicted in FIG. 2, it should be recognized that the embodiments described herein can extend to files (e.g. files 110 and/or files 134 of FIG. 1) or data belonging to any content category, that different file types can belong to the same content category, and that each content category can include one or more subcategories (e.g., "savory recipes", "breads" and "deserts" as subcategories of "recipes" 205). Further, content categories may be defined for non-file related characteristics relating to a user's utilization of a content management system, including the types electronic devices, the number of electronic devices, and/or the operating systems installed on electronic devices (e.g., client electronic devices 102a and 102b of FIG. 1) used to interact with a user account of the content management system. Based on the utilization of the various content categories, the content management system can generate intelligent account reconfiguration offers to the owner of the user account.

Content category total 207 may represent the total utilization of storage space for a user account registered with the content management system. In exemplary embodiments, as the utilization in total 207 changes over time, these variations may be detected, and various intelligent account reconfiguration offers may be generated. In a first example, as total utilization 207 increases between times t0 and t1, content category total 207 may approach a first total storage quota 217a. As used herein, the term "quota" may refer to a maximum permitted number or amount (e.g., a storage quota that cannot be exceeded), while the term "threshold" can refer to a number or amount that may be exceeded by a user, but the crossing of which triggers some action (e.g., extending an intelligent account reconfiguration offer). Total storage quota 217a may be an introductory storage quota, for example, which may be provided free of charge or for a relatively low one-time or recurring fee. Thus, once the user gets close to exceeding such a threshold, various embodiments may be utilized, and the opportunity is used to offer more storage and/or additional features in return for a longer term "paying customer" arrangement.

When total utilization 207 reaches a threshold usage level within a predetermined range 218a (e.g., 20%) of total storage quota 217a, the content management system may determine which content category or categories are at least partially responsible for the utilization in total 207 falling within predetermined range 218a. Thus, in this example, the content management system may determine that the addition of 10 GB of files within content category music 203 between t0 and t1 is primarily responsible for total utilization 207 approaching (and eventually exceeding) total storage quota 217a. In this example, therefore, the content management system may generate an account reconfiguration offer based on the determination that an increased usage in music 203 caused utilization in total 207 to fall within predetermined range 218a of total storage quota 217a.

An intelligent account reconfiguration offer generated in response to a determination that a usage level falls within a predetermined range of an established threshold can include specialized features appropriate for, or tailored to, the particular content category. An intelligent account reconfiguration offer based on content category music 203, for example, may include one or more specialized features for managing and/or enjoying music (e.g., playlist editors, music-specific organizers, metadata autofillers, etc.). Additionally or alternatively, the content management system may generate an offer for additional storage space specifically for storing files of the particular content category, which may, according to some embodiments, be tracked separately from total 207 (not shown). Such storage space may be made available, for example, at a lower rate than storage space for generalized use and/or at a reduced rate if the user accepts a generated intelligent offer for specialized features. The content management system may also offer to increase total storage quota 217a to a higher total storage quota 217b.

As time progresses, further intelligent offers may be generated based upon the usage level in total 207 falling within a predetermined range of a total storage quota (e.g., within a predetermined range 218b of total storage quota 217b). For instance, between times t3 and t4, as total utilization 207 enters predetermined range 218b, the content management system may determine that utilization in content categories photographs 202 and videos 204 are each at least partially responsible for the usage level falling within predetermined range 218b. Accordingly, the content management system may generate intelligent account reconfiguration offers based on one or both of those content categories. As described above, the offers can include specialized features sets (e.g., for editing, organizing, viewing, and sharing photographs and/or videos) as appropriate for the particular content category. The intelligent account reconfiguration offers based on utilization in photographs 202 and videos 204 may also include the creation of or increase in separate storage quotas for any or all of content categories photographs 202, videos 204, and total 207. Additionally, account reconfiguration offers that allow a user to revert to previous versions of client-side software may be provided to a user based on his or her usage of content management system 100.

It should be understood that the terms "primarily responsible" and "partially responsible" used in the context of determining whether utilization in a particular content category caused total 207 to exceed a predetermined threshold allow for flexibility in determining whether the content management system should generate, or should consider whether to generate, an intelligent offer for one or more content categories. In embodiments in which an intelligent offer may only be generated for a particular content category if utilization in that content category is "primarily responsible," then the intelligent offer may only be generated for the content category that contributed more than any other content category to the total utilization crossing a predetermined threshold. On the other hand, in embodiments in which an intelligent offer may be generated for content categories if utilization in that content category is "partially responsible," the intelligent offer may be generated for any or all content categories that contributed to the total utilization crossing a predetermined threshold. Various intelligent combinations of "partial" and "primarily" responsibility may be used in some embodiments to generate targeted offers most likely to be accepted by a user, thus furthering the goal of monetizing an exemplary content management system.

A decrease in usage levels for one or more content categories may also result in the generation of intelligent account reconfiguration offers. Because a decrease in usage level in a particular content category may indicate that the user is unhappy with the services currently provided, account reconfiguration offers may help to convince a user to continue using the content management system, especially, for example, if the user is unaware that a particular feature exists. Intelligent account reconfiguration offers generated in response to decreasing utilization may include, for example, an enhanced feature set, increased storage, decreased storage, discounted rates, or other suitable offers associated with the content category. Accordingly, as depicted in FIG. 2, the content management system may generate an intelligent account reconfiguration offer when utilization of storage space in the content category music 203 begins to decrease between t4 and t5. The content management system may wait until utilization in the content category drops a predetermined amount (e.g., 20% from a maximum measured utilization) before generating an account reconfiguration offer.

The actual offer or offers generated in response to detecting a decrease in utilization within a content category may depend on an analysis of the user's activity within the content category before the usage level decreased. For example, if the user approached a storage quota for the content category and removed data stored in that content category rather than paying increased fees to increase the quota, the content management system may generate an offer to increase the storage quota for free or for a reduced rate. Additionally or alternatively, if the usage level decreases before the user upgrades a feature set for the content category, the content management system can generate an account reconfiguration offer for an enhanced feature set. The account reconfiguration offer may offer the enhanced feature set, according to various embodiments, for free, free for a limited time, or at a reduced rate in perpetuity or for a limited time.

In some embodiments, when a user's utilization (total utilization and/or utilization in a particular content category) decreases below a predetermined threshold, the content management system can run analytics on characteristics of the utilization prior to the decrease. Such characteristics may include, for example, increases or decreases in the usage of features related to particular content categories, increases or decreases in storage space used for particular content categories, total time spent accessing the content management system, the amount of time the user spent accessing tutorials associated with various features of the content management system, whether the user contacted technical support or submitted any comments or questions to a help service associated with the content management system, and/or any other characteristics that may explain a decrease in utilization. While such analytics may be run on all user accounts, or a subset of user accounts, the analytics run on user accounts with a decrease in utilization may be scrutinized in more depth. For example, the content management system may analyze a larger number of characteristics and/or may analyze characteristics over a longer period of time as compared with user accounts without decreased utilization.

It should be understood that intelligent account reconfiguration offers may be generated when utilization of any particular content category reaches a predetermined threshold (e.g., falls within a range of a predetermined quota or reaches a certain activity threshold), without reference to total utilization 207 or total storage quotas 217a and 217b. Furthermore, because total utilization 207 and content categories 201-206 can be understood as a category and subcategories, the content management system can apply any of the above-described features to content categories 201-206 and subcategories of those categories. Therefore, at time t0, which may represent the time the user account is created, for example, (or any other suitable time) the content management system can define individual quotas and/or thresholds for one or more recognized content categories. When utilization of storage space for such a content category crosses the corresponding content category threshold, the content management system can generate an intelligent account reconfiguration offer based on the content category and/or one or more subcategories.

As noted above, the individual content category thresholds may indicate usage levels that can be crossed without a user incurring extra fees or being prevented from storing additional files within the content management system. The content management system may refer to the thresholds to determine when to generate an intelligent offer for the user account (e.g., in advance of the user reaching a hard quota). In one specific example, the content management system can set a threshold for photographs 202 at 5 GB. When utilization of storage space for photographs 202 reaches the 5 GB threshold (e.g., between t2 and t3 in FIG. 2) the content management system may generate an intelligent account reconfiguration offer associated with photographs 202.

According to some embodiments, the content management system can generate intelligent account reconfiguration offers when the user begins to use a new content category. Such intelligent account reconfiguration offers may be generated any time after a user account is registered with the content management system. Thus, from time t0 onwards, the content management system may only generate intelligent offers associated with documents 201, which is the only content category populated at that time. As time progresses, and user storage patterns change, further intelligent account reconfiguration offers may be generated each time a new content category is populated (e.g., at t1 for photographs 202 and music 203, at t2 for videos 204, etc.).

Additionally or alternatively, intelligent offers may be generated based on an increased rate of utilization in a particular content category. For example, utilization in videos 204 increases slowly from times t0-t3, while utilization increases quickly from times t3-t5. The actual utilization rate for a particular content category may be compared against a threshold utilization rate to determine whether to generate an intelligent account reconfiguration offer based on that content category. Threshold utilization rates may be established by building user model for each content category corresponding to various user classes. Each user class may represent, for example, a particular account configuration (e.g., basic, enhanced, premier, etc.). If the user's utilization rate exceeds that of the user model in the same user class, the user may be presented with an account reconfiguration offer.

According to some embodiments, content-category specific thresholds may be set based upon the type of content represented in each content category. Content-category specific storage thresholds may be set to correspond generally with the usage level in a particular category, correcting for differences in the file sizes typically associated with each content category. For example, because a video file may generally take up more storage space than a photograph, even low-level and/or intermittent usage of storage space for video files may require significantly more storage space than high-level and/or frequent usage of storage space for photographs. Accordingly, a content-category specific threshold for videos 204 may be set higher (e.g., at 25 GB) than a threshold for photographs 202 (e.g., at 4 GB), which may be, in turn, set higher than a threshold for guitar tabs 206 (e.g., at 10 MB).

According to some embodiments, content-category specific thresholds may be set based on one or more machine learning algorithms. In these embodiments, the content management system may leverage data collected from all, or a suitable subset, of user accounts registered with the content management system to determine appropriate thresholds. In a first example, the content management system can determine a usage level for each particular content category at which users typically sign up for account reconfigurations without first receiving specific offers from the content management system. In those examples, the content management system can proactively target users to receive intelligent account reconfiguration offers who are likely to desire particular account reconfigurations by setting appropriate content category thresholds. In a second example, the content management system can determine appropriate content-category specific thresholds based on responses to generated account reconfiguration offers. In these examples, the content management system may recursively home in on appropriate thresholds by changing the thresholds as a function of user responses. Thus, the content management system can set a threshold at a level where a percentage of positive responses to generated account reconfiguration offers reaches a desired level (e.g., 20%).

Figure 3:
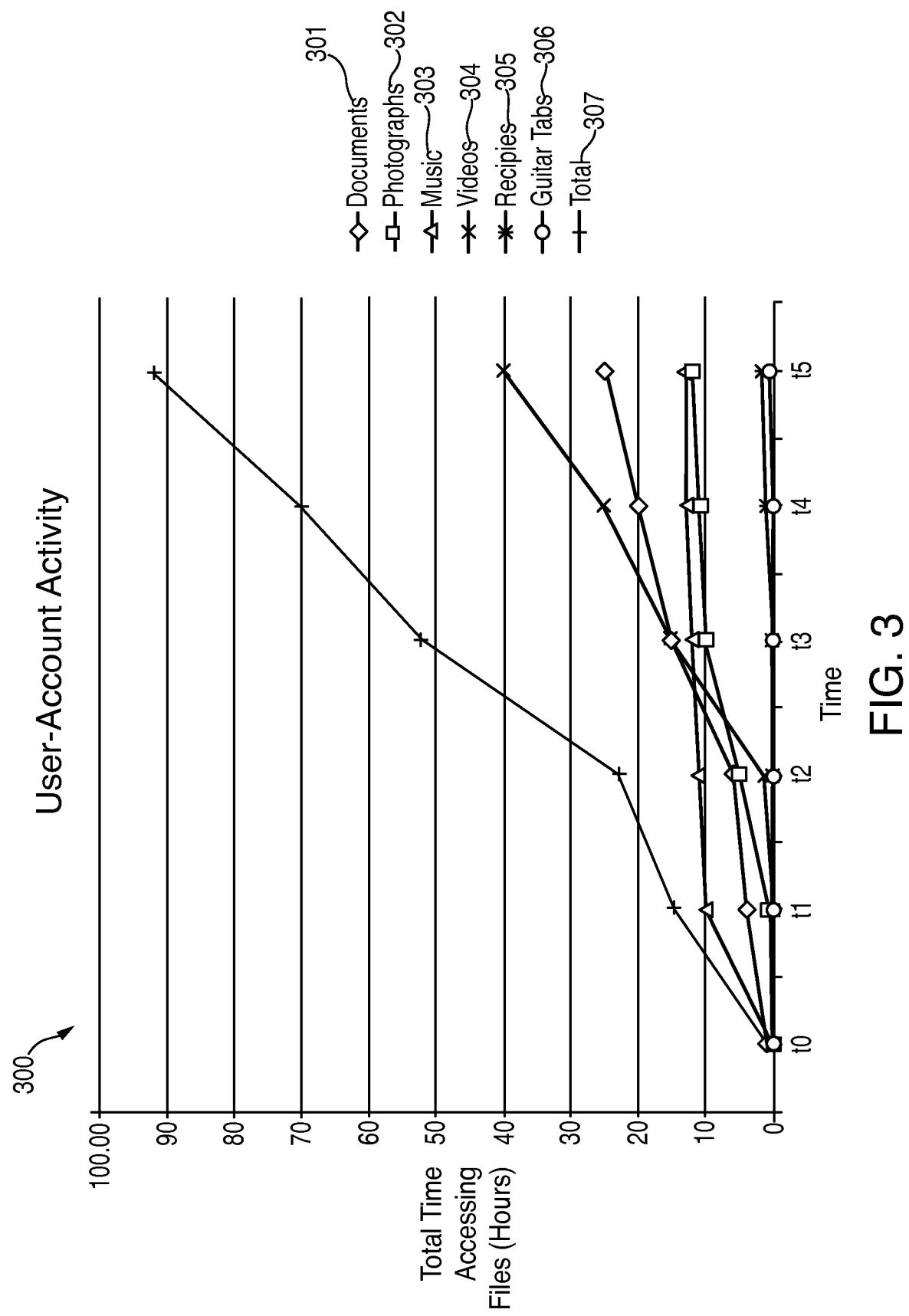
FIG. 3 depicts a line chart illustrating user-account activity utilization over time, in accordance with some embodiments.

FIG. 3 depicts a line chart 300 illustrating user-account activity over time, in accordance with some embodiments. Line chart 300 can represent user activity by content category for a user account accessing a content management system (e.g., content managements system 100 of FIG. 1). The content management system can track user-account activity using any suitable metrics over a given period of time, including, for example, the amount of time spent accessing files (e.g., files 134) in each content category, the number of shares of files within each content category, the regularity of the user activity, the total number of files accessed in each content category, and/or the total number of separate file interactions in each content category. For purposes of clarity, user-account activity is displayed on line chart 300 only as a function of amount of total time accessing files over the period of time t0-t5. The content categories depicted in FIG. 3, namely documents 301, photographs 302, music 303, videos 304, recipes 305, guitar tabs 306, and total 307, can represent corresponding content categories 201-207 of FIG. 2.

According to some embodiments, the content management system can generate intelligent account reconfiguration offers based on one or more measures of user-account activity in addition, or as an alternative, to user-account storage utilization metrics described above with respect to FIG. 2. In particular, given that file sizes can vary significantly between content categories (e.g., one video file categorized in videos 304 may require the same amount of storage space as many thousands of word processing documents categorized in documents 301), measuring user-account activity across various content categories can enable the content management system to determine whether a user would be amenable to receiving intelligent account reconfiguration offers in circumstances where relying only on measuring storage space may be inadequate. That is, simply relying on the amount of storage space utilized in a particular content category may belie the extent to which the user actually uses files in that content category. For example, although the amount of storage space utilized in documents 201 of FIG. 2 is relatively low and static, user account activity metrics may show that the user views, edits, and/or shares files in documents 201 at a pace that warrants generation of an intelligent account reconfiguration offer based on activity in that content category.

To determine whether to generate an intelligent account reconfiguration offer based at least in part on user-account activity, the content management system can compare the user-account activity against one or more threshold values, which may be specifically tailored for each content category. For embodiments in which the content management system determines user-account activity levels based upon the amount of time accessing files in each content category, for example, a determination that a user spent more time watching full-length movies in content category videos 304 than viewing dinner recipes in content category recipes 305 may overestimate the user's activity in videos 304 and underestimate the user's activity in recipes 306 as the video format may inherently require quite a lot of time as compared with viewing recipes. Thus, as depicted in FIG. 3, a threshold 304a for generating an intelligent offer for videos 304 based on the total amount of time spent viewing files may be set at 20 hours while a threshold 305a for recipes 305 may be set at 2 hours. As described above, with respect to FIG. 2, the threshold levels for user-account activity based intelligent account reconfiguration offers may be set based on machine learning algorithms that can rely on feedback to generated offers received from numerous user accounts across the content management system and/or determinations of activity levels in content categories across numerous user accounts that typically correspond to users requesting account reconfigurations.

According to some embodiments, thresholds for different content categories can reference different activity metrics based on the recognition that a single activity metric may not appropriately measure user activity for every content category. For example, because a user might not interact with a file categorized in recipes 305 for extended periods of time, and may not interact with more than one file per session, the content management system may determine that user activity based upon the number of shares with other users or the regularity of the user's activity within recipes 305 (e.g., whether the user accesses files in recipes 305 daily, weekly, or monthly) may represent more appropriate metrics for determining user activity for that content category. On the other hand, the total amount of time a user spends watching files in videos 304 may be a satisfactory metric for determining the user's activity level for that content category.

FIG. 4 depicts a table 400 of illustrative storage and activity thresholds for generating intelligent account reconfiguration offers based on utilization across different content categories of a content management system, in accordance with some embodiments. It should be understood that the thresholds depicted in FIG. 4 are merely exemplary and any suitable thresholds may be provided for each content category and each storage or activity metric. As noted above, the various thresholds can be established based upon a machine learning algorithm that takes into account data from one or more user accounts registered with the content management system. It should also be understood that the storage and activity thresholds shown in FIG. 4 and discussed above are not meant to represent an exhaustive list of the types of metrics that can be used to determine whether or not to generate an intelligent account reconfiguration offer.

According to some embodiments, the content management system may require that more than one threshold be met before generating an intelligent account reconfiguration offer. For example, before generating an intelligent account reconfiguration offer based on content category music 403, the content management system may wait until a user has reached both a 20 GB storage utilization threshold and a total viewing (or listening) time of 15 hours. Relying on more than one metric may increase the probability that the user would be interested in reconfiguring their account to upgrade their features and/or storage related to music 403. Generally speaking, the content management system may require that any combination of storage and activity thresholds be met before generating an intelligent account reconfiguration offer, and particular combinations may be established based upon on or more machine learning algorithms.

Figure 5:
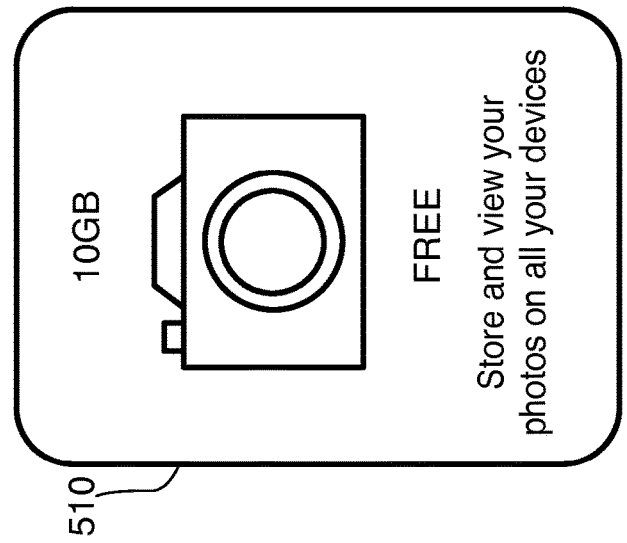
FIG. 5 depicts a user interface of an illustrative intelligent account reconfiguration offer, in accordance with some embodiments.
Figure 5:
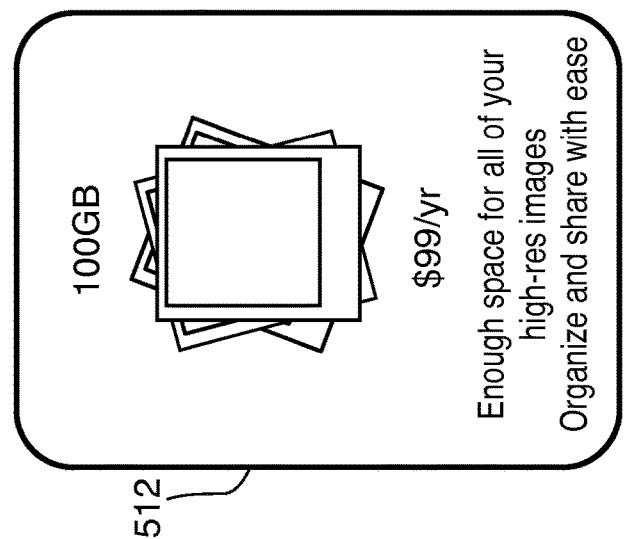
Figure 5:
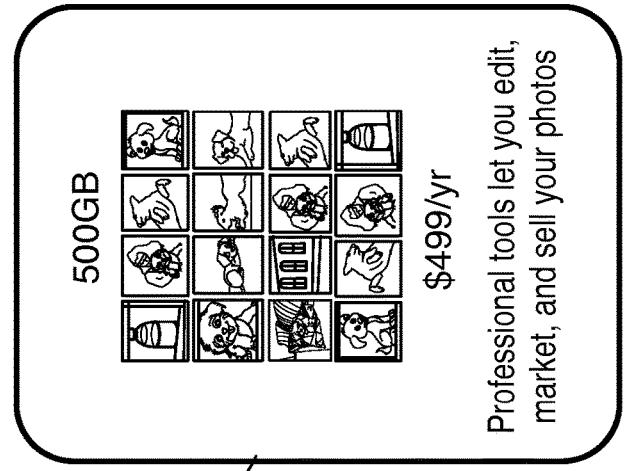
Figure 5:
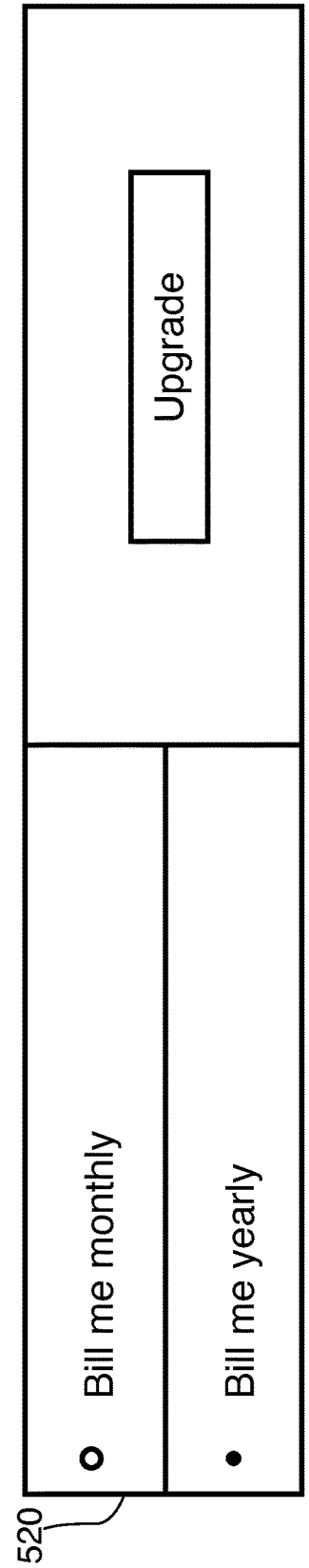

FIG. 5 depicts a user interface 500 of an illustrative intelligent account reconfiguration offer, in accordance with some embodiments. In particular, user interface 500 can be an intelligent account reconfiguration offer related to a photographs content category (e.g., photographs 202 of FIG. 2). User interface 500 can include intelligent offers 510, 512, and 514, which can each represent a particular account configuration or reconfiguration available to a user of a content management system.

Intelligent offer 510 can represent a user-account configuration in which the user receives a free 10 GB of storage space specifically for storing photos. Such an account reconfiguration may be an upgrade from an initial account configuration that only provides generalized storage space, and which may not be optimized for storing, viewing, organizing, and/or sharing photos. In some embodiments, the 10 GB of storage space available for free may be provided separately from, and in addition to, any previously-provided storage space.

Intelligent offer 512 can represent a user-account configuration in which the user receives 100 GB of storage space for storing photos as well as enhanced features for organizing and sharing photographs via the content management system. Similarly, intelligent offer 514 can represent a user-account configuration in which the user receives 500 GB of storage space as well as professional tools for editing, marketing, and selling photographs. Such intelligent offers may be provided to a user of the content management system if it is determined that the user may want or require additional storage space or features.

Although intelligent account reconfiguration offers 512 and 514 include increases in both the storage space and features made available to the user, it should be understood than an intelligent account reconfiguration offer may include any combination of account reconfiguration offers. For instance, an intelligent account reconfiguration offer may include any one or more of: an increase in available storage space; a decrease in available storage space; an increase in available features; and a decrease in available features. Offers for decreases in available storage and/or features may include a decrease in the total fees charged for the user account, for example.

Intelligent offer 510 may be provided to a user alone or along with intelligent offers 512 and 514 after a user reaches a particular storage and/or activity threshold (e.g., one or more of the storage and/or activity thresholds for photos 402 in table 400 of FIG. 4). In some embodiments, a first intelligent offer (e.g., intelligent offer 510) may be provided once the user reaches a first storage and/or activity threshold while further intelligent offers (e.g., intelligent offers 512 and 514) may only be provided after the user has reached one or more further storage/activity thresholds. The further storage/activity thresholds may be enhanced thresholds that require more storage or activity utilization above and beyond those representing an initial storage/activity threshold. In other embodiments, further intelligent offers may be provided if the user reaches a certain number of established storage/activity thresholds (e.g., the user reaches the storage utilization threshold as well as the total viewing time and total number of shares activity thresholds for photographs 402 in FIG. 2). In still other embodiments, all available intelligent offers may be provided once a user reaches one or more established storage/activity thresholds. Thus, various intelligent offers combinations may be flexibly provided to a user based upon their usage of the content management system.

Figure 6:
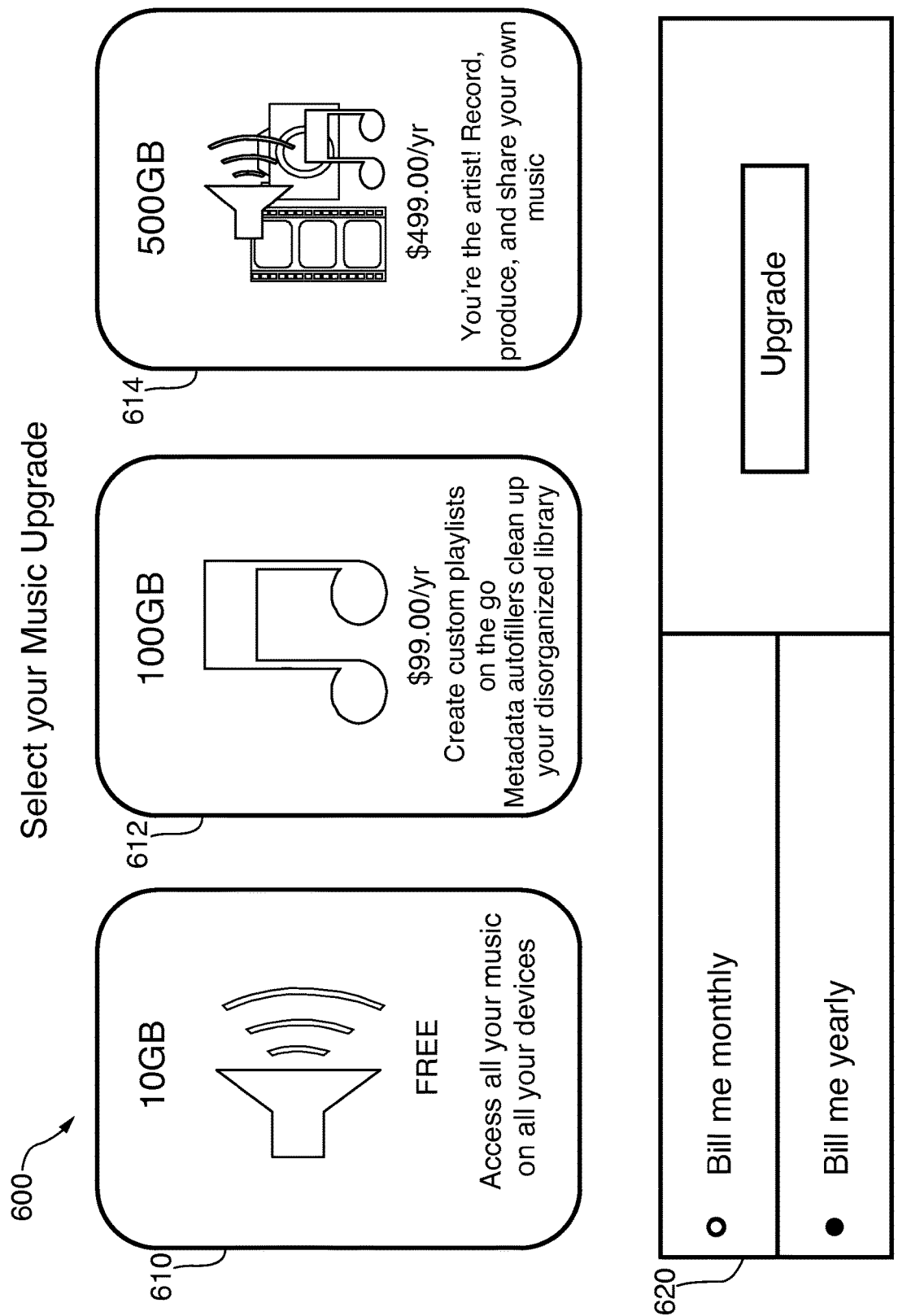
FIG. 6 depicts another user interface of an illustrative intelligent account reconfiguration offer, in accordance with some embodiments.

FIG. 6 depicts a user interface 600 of an illustrative intelligent account reconfiguration offer, in accordance with some embodiments. In particular, user interface 600 can be an intelligent account reconfiguration offer related to a music content category (e.g., music 203 of FIG. 2). User interface 600 can include intelligent offers 610, 612, and 614, which can each represent a particular account configuration or reconfiguration available to a user of a content management system. Intelligent offers 610, 612, and 614 may be similar to intelligent offers 510, 512, and 514 of FIG. 5 except that the intelligent offers may be related to a music content category rather than a photographs content category. Accordingly, intelligent offers 610, 612, and 614 may be generated and provided to a user upon the user reaching one or more storage/activity thresholds associated with the use of the content management system for music, specifically.

Intelligent offer 610 can represent a user-account configuration in which the user receives a free 10 GB of storage space specifically for storing music. Such an account reconfiguration may be an upgrade from an initial account configuration that only provides generalized storage space, and which may not be optimized for storing, sharing, and/or listening to music on more than one electronic device with access to the content management system. In some embodiments, the 10 GB of storage space available for free may be provided separately from, and in addition to, any previously-provided storage space.

Intelligent offer 612 can represent a user-account configuration in which the user receives 100 GB of storage space for storing music as well as enhanced features for organizing and managing music (e.g., features for creating custom playlists and/or auto-organizing a music library) via the content management system. Similarly, intelligent offer 614 can represent a user-account configuration in which the user receives 500 GB of storage space as well as professional tools for recording, producing, and sharing music. Such intelligent offers may be provided to a user of the content management system if it is determined that the user may want or require additional storage space or features based on the user's usage of the content management system.

Figure 7:
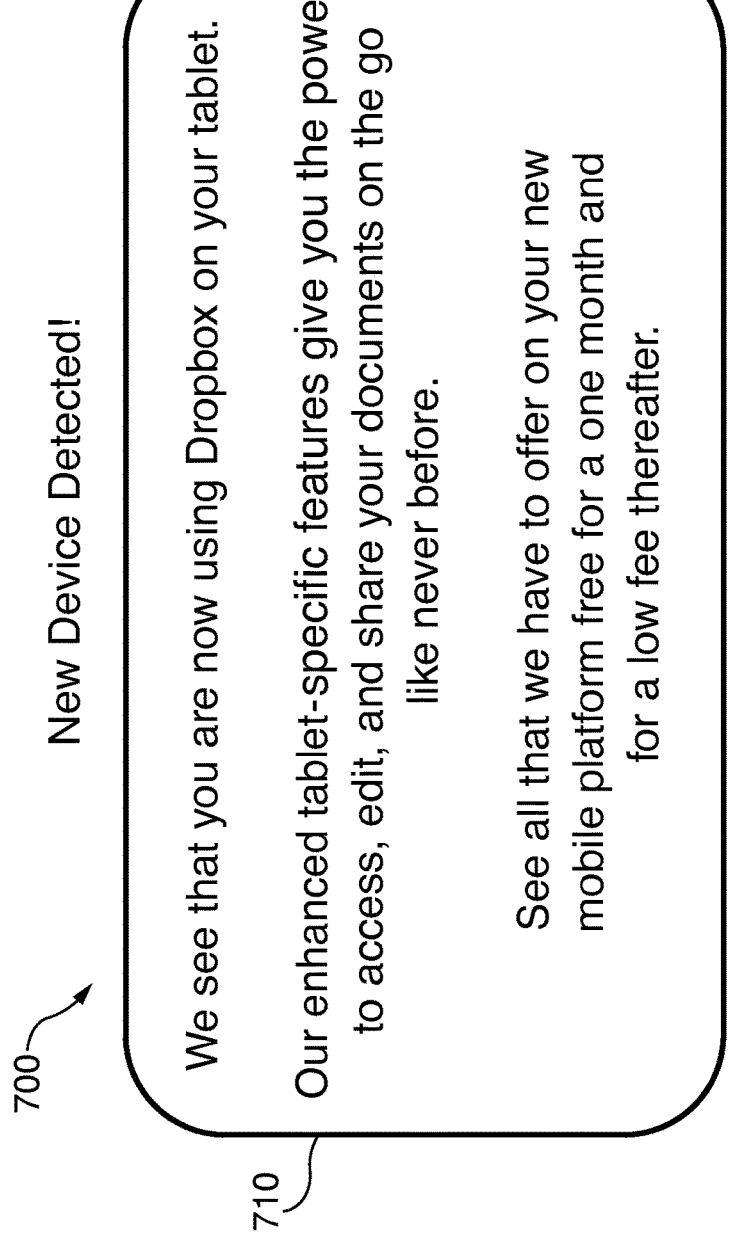
FIG. 7 depicts yet another user interface of an illustrative intelligent account reconfiguration offer, in accordance with some embodiments.
Figure 7:
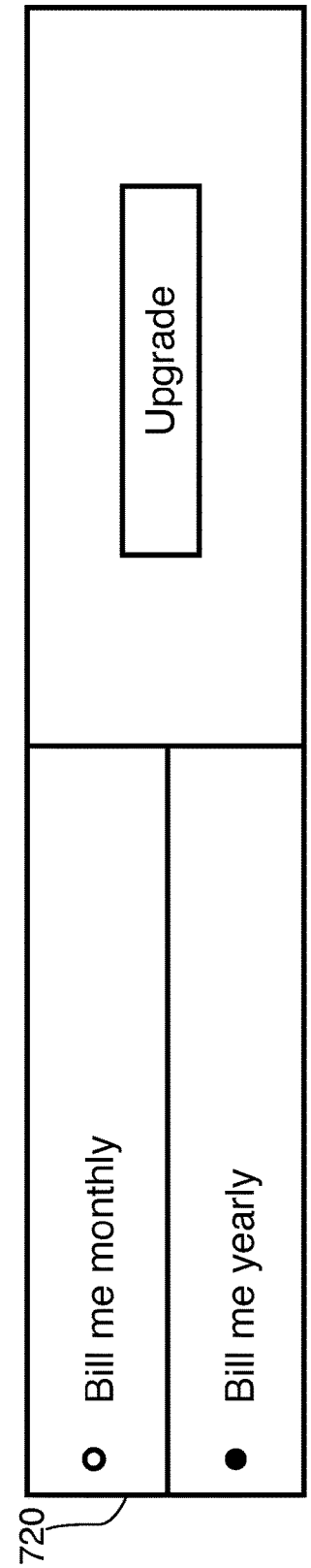

FIG. 7 depicts a user interface 700 of an illustrative intelligent account reconfiguration offer, in accordance with some embodiments. In particular, user interface 700 can be an intelligent account reconfiguration offer related to the content management system detecting that a new electronic device has been associated with a user account of a content management system. User interface 700 may be generated, for example, if a user associates a tablet device with a user account that had been previously accessed with only a PC and/or a smartphone. The intelligent account reconfiguration offer may include an enhanced feature set only available for and/or optimized for tablet computing. In some embodiments, the enhanced features may include syncing contacts data, syncing state data from applications installed on the new electronic device, and/or utilizing security features extant on the new electronic device, for example. As depicted, the device-specific features may be offered for free for a limited time and then for a fee thereafter.

Intelligent account reconfiguration offers such as the one shown in user interface 700 may be generated any time a user associates a new device with an existing user account. Accordingly, if device-specific features are available for any particular client device (e.g., client electronic device 102a) those features can be offered to the user when the user associates that client device with the user account. It should be understood that the device-specific features may also include features that take advantage of capabilities that depend on the operating system ("OS") of the client device associated with the user account. Accordingly, if features are available for a smartphone running a first OS and not available for a smartphone running a second OS, the features may be offered to a user who associates the smartphone running the first OS with the user account on the content management system.

Figure 8:
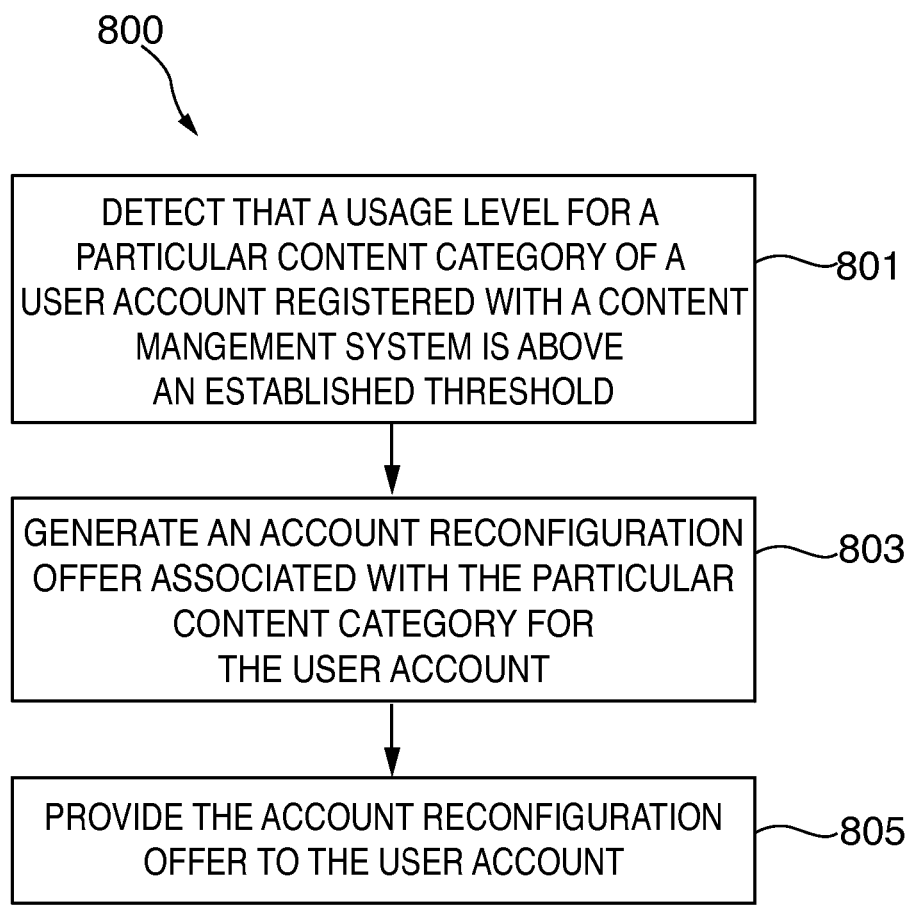
FIG. 8 depicts a flowchart of an illustrative process for generating intelligent account reconfiguration offers, in accordance with some embodiments.

FIG. 8 depicts a flowchart of an illustrative process 800 for generating intelligent account reconfiguration offers, in accordance with some embodiments. Process 800 can begin at step 801, in which a content management system (e.g., content management system 100 of FIG. 1) can detect that a usage level for a particular content category of a user account registered with the content management system is above an established threshold. As noted above, any number of content categories including, but not limited to, content categories for documents, photographs, music, videos, recipes, guitar tabs, may be defined for the content management system.

In some embodiments, the established threshold may represent a storage threshold defined for the content category. The storage threshold may be defined as a usage level that falls within a predetermined range of a quota (e.g., a storage quota for the particular content category). Thus, if a user account has a 5 GB storage quota for files in the photographs content category, a storage threshold may be set within a predetermined range of that quota (e.g., at 4 GB). It should be understood, however, that establishing a storage-based threshold need not be dependent on the existence of a storage quota for a particular content category. Accordingly, a storage threshold can be set at any suitable level (e.g., as a function of average file size for the content category). According to some embodiments, a storage threshold can be established for one or more content categories based on a machine learning algorithm based upon data collected from all or a subset of user accounts registered with the content management system. Accordingly, one or more distinct storage thresholds may be associated with each content category defined for the content management system, and the storage thresholds may be set at a storage utilization level at which users typically sign up for account reconfigurations or a storage utilization level at which users respond positively to account reconfiguration offers, for example.

In some embodiments, the established threshold may represent an activity threshold defined for the content category. The activity threshold may be defined as a usage level representing a particular type of activity within the content category, such as total viewing time, total number of shares, regularity of use, a total number of distinct files accessed, or a total number of file interactions for files in a content category, for example.

Because different metrics may better estimate a user's usage level for a particular content category, the established threshold used to trigger the generation of an intelligent offer may differ for each particular category. For example, a photographs content category may measure a user's usage level with respect to storage utilization, while a videos content category may measure a user's usage level with respect to total viewing time. Moreover, according to some embodiments, exceeding more than one storage or activity threshold may be required before an intelligent offer is generated for a particular content category. For example, the content management system may wait for storage utilization and the total number of shares for files in a photographs content category to exceed predetermined thresholds before generating an intelligent offer for that content category.

At step 803, the content management system may generate an account reconfiguration offer associated with the particular content category for the user account. The account reconfiguration offer may be presented to the user using any suitable user interface (e.g., user interface 500, 600, or 700) and using any suitable delivery method (e.g., email, SMS, or within an application running on a client device or in an Internet browser). The account reconfiguration offer may include any number of account reconfiguration options based on the particular content category exceeding the established threshold in step 801. Therefore, the account reconfiguration offers may include offers to increase or decrease a storage quota or to increase or decrease available features related to the particular content category. Storage and feature reconfigurations may be bundled together, or they may be offered separately according to various embodiments.

Figure 9:
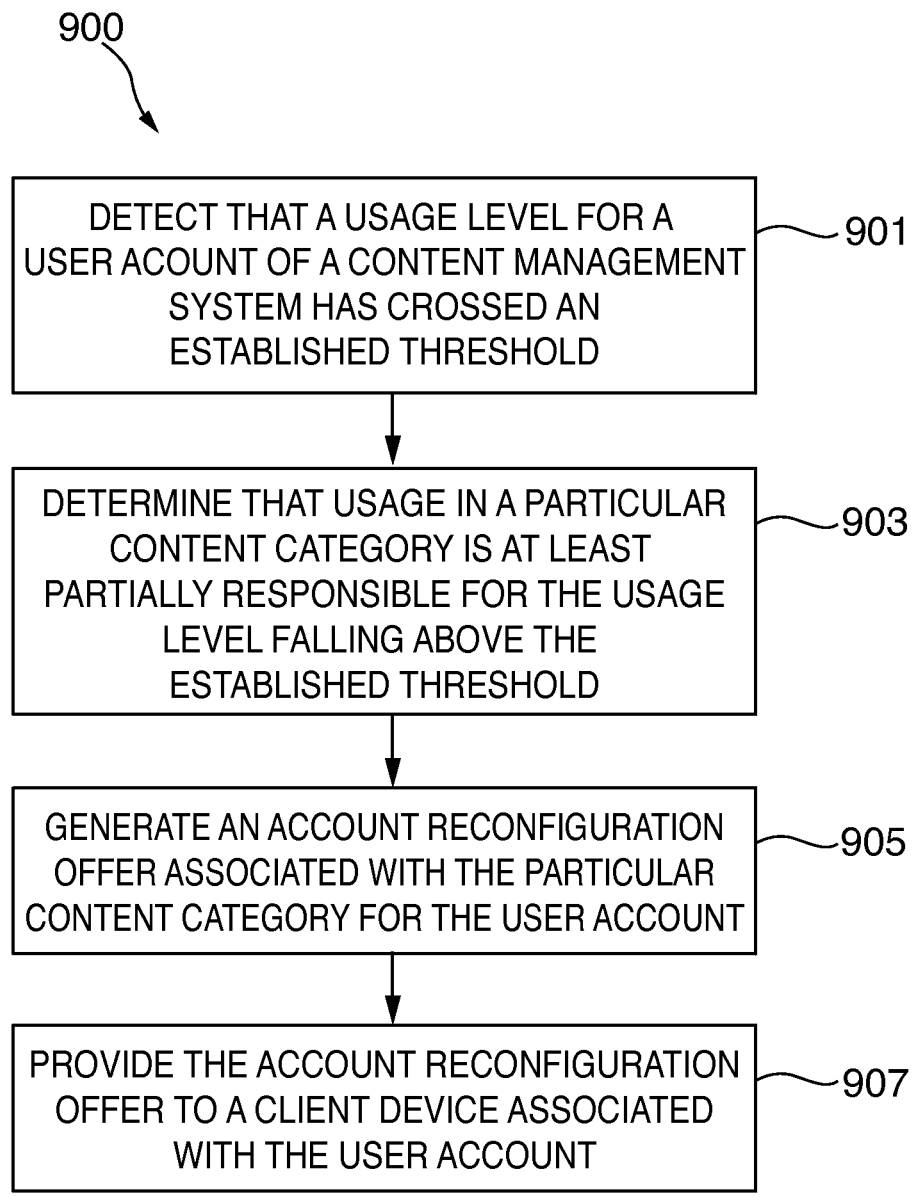
FIG. 9 depicts a flowchart of another illustrative process for generating intelligent account reconfiguration offers, in accordance with some embodiments.

FIG. 9 depicts a flowchart of an illustrative process 900 for generating intelligent account reconfiguration offers, in accordance with some embodiments. Process 900 can begin at step 901 in which a content management system (e.g., content management system 100 of FIG. 1) can detect that a usage level for a user account of the content management system is above an established threshold. The established threshold may be related to the total utilization of the content management system or the utilization of one or more individual content categories defined for the content management system (e.g., documents, photographs, music, videos, recipes, guitar tabs, or any other suitable content category). Further, the established threshold can be defined for storage utilization or activity utilization in one of the content categories or in sum over all or any of the content categories. In some embodiments, the established threshold may be defined as a usage level that falls within a predetermined range of a quota (e.g., a total storage quota or a storage quota for a particular content category).

If the established threshold is based upon a total utilization metric (e.g., a total storage or total utilization metric), the content management system may determine that usage in a particular content category is at least partially responsible for the usage level falling above the established threshold at step 903. Referring back to FIG. 2, for example, when total storage utilization crosses total storage threshold 218b between times t3 and t4, the content management system may then analyze storage utilization in content categories 201-206 to determine which content categories are at least partially responsible for exceeding the threshold. In that example, storage utilization increased between t3 and t4 for photographs 202, music 203, videos 204, and recipes 205, and therefore, each is at least partially responsible for total storage utilization exceeding total storage threshold 218b. Because the increase in storage utilization between t3 and t4 was greatest for videos 204, the content management system can designate videos 204 as being primarily responsible for total storage utilization exceeding total storage threshold 218b.

At step 905, the content management system can generate an account reconfiguration offer associated with the particular content category for the user account. In some embodiments, an account reconfiguration offer may be generated for each content category that was at least partially responsible for the usage level falling above the established threshold. In other embodiments, however, an account reconfiguration offer may be generated only for the content category that was primarily responsible for the usage level falling above the established threshold.

Exemplary Implementations

Any suitable programming language can be used to implement the routines of particular embodiments including, but not limited to, the following: C, C++, Java, JavaScript, Python, Ruby, CoffeeScript, assembly language, etc. Different programming techniques can be employed, such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for date and time handling thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A computer-implemented method performed at one or more computing devices comprising one or more processors, the method comprising:
   a content management system maintaining a user account, a plurality of content items associated with the user account, and metadata for each content item of the plurality of content items;
   wherein the plurality of content items belongs to a particular content category;
   wherein maintaining the plurality of content items comprises the content management system storing, in a data store, for each content item, of the plurality of content items, data that belongs to the each content item;
   wherein maintaining metadata for each content item of the plurality of content items comprises the content management system storing metadata for each content item, of the plurality of content items, that indicates the data stored in the data store that belongs to the each content item;

the content management system tracking and determining a content category specific number of shares by the user account of the plurality of content items;

wherein each share of the content category specific number of shares by the user account involves the content management system publicly or privately sharing a content item of the plurality of content items that belongs to the particular content category;

wherein if the content management system privately shares a content item of the plurality of content items belonging to the particular content category, then the content management system associates, in a database, (a) at least one target user account held with the content management system with (b) the content item, such that the at least one target user account is granted an access to the content item in the content management system;

wherein if the content management system publicly shares a content item of the plurality of content items belonging to the particular content category, then the content management system generates a custom network address for use with a web browser to access the content item at the custom network address without an authentication;

the content management system determining whether the content category specific number of shares by the user account exceeds a first content category specific threshold;

wherein the first content category specific threshold is greater than one;

the content management system providing, in a graphical user interface at a client device associated with the user account, a content category specific offer to upgrade the user account to have access to a content category specific feature of the content management system; and wherein the providing the content category specific offer is based on the content category specific number of shares by the user account exceeding the first content category specific threshold.

2. One or more non-transitory computer-readable media storing instructions which, when executed by one or more processors, cause the one or more processors to perform operations comprising:

a content management system maintaining a user account, a plurality of content items associated with the user account, and metadata for each content item of the plurality of content items;

wherein the plurality of content items belongs to a particular content category;

wherein maintaining the plurality of content items comprises the content management system storing, in a data store, for each content item, of the plurality of content items, data that belongs to the each content item;

wherein maintaining metadata for each content item of the plurality of content items comprises the content management system storing metadata for each content item, of the plurality of content items, that indicates the data stored in the data store that belongs to the each content item;

the content management system tracking and determining a content category specific number of shares by the user account of the plurality of content items;

wherein each share of the content category specific number of shares by the user account involves the content management system publicly or privately sharing a content item of the plurality of content items that belongs to the particular content category;

wherein if the content management system privately shares a content item of the plurality of content items belonging to the particular content category, then the content management system associates, in a database, (a) at least one target user account held with the content management system with (b) the content item, such that the at least one target user account is granted an access to the content item in the content management system;

wherein if the content management system publicly shares a content item of the plurality of content items belonging to the particular content category, then the content management system generates a custom network address for use with a web browser to access the content item at the custom network address without an authentication;

the content management system determining whether the content category specific number of shares by the user account exceeds a first content category specific threshold;

wherein the first content category specific threshold is greater than one;

the content management system providing, in a graphical user interface at a client device associated with the user account, a content category specific offer to upgrade the user account to have access to a content category specific feature of the content management system; and wherein the providing the content category specific offer is based on the content category specific number of shares by the user account exceeding the first content category specific threshold.

3. The computer-implemented method of claim 1, wherein the content category specific offer, when accepted by user input directed to the graphical user interface, allows a user of the user account to use the content category specific feature with the plurality of content items that belongs to the particular content category.

4. The one or more non-transitory computer-readable claim 2, wherein the content category specific offer, when accepted by user input directed to the graphical user interface, allows a user of the user account to use the content category specific feature with the plurality of content items that belongs to the particular content category.

5. The computer-implemented method of claim 1, wherein the particular content category is selected from the group consisting of documents, photographs, music, videos, recipes, and guitar tabs.

6. The one or more non-transitory computer-readable media of claim 2, wherein the particular content category is selected from the group consisting of documents, photographs, music, videos, recipes, and guitar tabs.

7. The computer-implemented method of claim 1, wherein the particular content category is photographs and the content category specific feature of the content management system allows the user account to edit, market, and sell digital photographs.

8. The one or more non-transitory computer-readable media of claim 2, wherein the particular content category is photographs and the content category specific feature of the content management system allows the user account to edit, market, and sell digital photographs.

9. The computer-implemented method of claim 1, wherein the particular content category is music and the content category specific feature of the content management system allows the user account to record, market, and sell digital music creations.

10. The one or more non-transitory computer-readable media of claim 2, wherein the particular content category is music and the content category specific feature of the content management system allows the user account to record, market, and sell digital music creations.

11. A computing system comprising:
one or more processors;
storage media;
instructions stored in the storage media and which, when executed by the computing system, cause the computing system to perform:
a content management system maintaining a user account, a plurality of content items associated with the user account, and metadata for each content item of the plurality of content items;
wherein the plurality of content items belongs to a particular content category;
wherein maintaining the plurality of content items comprises the content management system storing, in a data store, for each content item, of the plurality of content items, data that belongs to the each content item;
wherein maintaining metadata for each content item of the plurality of content items comprises the content management system storing metadata for each content item, of the plurality of content items, that indicates the data stored in the data store that belongs to the each content item;
the content management system tracking and determining a content category specific number of shares by the user account of the plurality of content items;
wherein each share of the content category specific number of shares by the user account involves the content management system publicly or privately sharing a content item of the plurality of content items that belongs to the particular content category;
wherein if the content management system privately shares a content item of the plurality of content items belonging to the particular content category, then the content management system associates, in a database, (a) at least one target user account held with the content management system with (b) the content item, such that the at least one target user account is granted an access to the content item in the content management system;
wherein if the content management system publicly shares a content item of the plurality of content items belonging to the particular content category, then the content management system generates a custom network address for use with a web browser to access the content item at the custom network address without an authentication;
wherein the first content category specific threshold is greater than one;
the content management system determining whether the content category specific number of shares by the user account exceeds a first content category specific threshold;
the content management system providing, in a graphical user interface at a client device associated with the user account, a content category specific offer to upgrade the user account to have access to a content category specific feature of the content management system; and
wherein the providing the content category specific offer is based on the content category specific number of shares by the user account exceeding the first content category specific threshold.

12. The computing system of claim 11, wherein the content category specific offer, when accepted by user input directed to the graphical user interface, allows a user of the user account to use the content category specific feature with the plurality of content items that belongs to the particular content category.

13. The computer-implemented method of claim 1, further comprising:
the content management system determining whether a first usage level of the plurality of content items that belong to the particular content category exceeds a second content category specific threshold;
wherein the second content category specific threshold is one of: a total viewing time threshold, a regularity of use threshold, a total number of distinct files accessed threshold, or a total number of file interactions threshold;
the content management system determining whether a second usage level, of the plurality of content items that belong to the particular content category, exceeds a content category specific storage threshold; and
wherein the providing the content category specific offer is based on all of: the content category specific number of shares by the user account exceeding the first content category specific threshold, the first usage level exceeding the second content category specific threshold, and the second usage level exceeding the content category specific storage threshold.

14. The computer-implemented method of claim 13, wherein the second content category specific threshold is a total viewing time threshold.

15. The computer-implemented method of claim 13, wherein the second content category specific threshold is a total number of distinct files accessed threshold.

16. The computer-implemented method of claim 13, wherein the second content category specific threshold is a total number of file interactions threshold.

17. The one or more non-transitory computer-readable media of claim 2, the operations further comprising:
the content management system determining whether a first usage level of the plurality of content items that belong to the particular content category exceeds a second content category specific threshold;
wherein the second content category specific threshold is one of: a total viewing time threshold, a regularity of use threshold, a total number of distinct files accessed threshold, or a total number of file interactions threshold;
the content management system determining whether a second usage level, of the plurality of content items that belong to the particular content category, exceeds a content category specific storage threshold; and
wherein the providing the content category specific offer is based on all of: the content category specific number of shares by the user account exceeding the first content category specific threshold, the first usage level exceeding the second content category specific threshold, and the second usage level exceeding the content category specific storage threshold.

18. The one or more non-transitory computer-readable media of claim 17, wherein the second content category specific threshold is a total viewing time threshold.

19. The one or more non-transitory computer-readable media of claim 17, wherein the second content category specific threshold is a total number of distinct files accessed threshold.

20. The one or more non-transitory computer-readable media of claim 17, wherein the second content category specific threshold is a total number of file interactions threshold.

21. The computing system of claim 11, further comprising:
- instructions stored in the storage media and which, when executed by the computing system, cause the computing system to perform:
- the content management system determining whether a first usage level of the plurality of content items that belong to the particular content category exceeds a second content category specific threshold;
- wherein the second content category specific threshold is one of: a total viewing time threshold, a regularity of use threshold, a total number of distinct files accessed threshold, or a total number of file interactions threshold;
- the content management system determining whether a second usage level, of the plurality of content items that belong to the particular content category, exceeds a content category specific storage threshold; and
- wherein the providing the content category specific offer is based on all of: the content category specific number of shares by the user account exceeding the first content category specific threshold, the first usage level exceeding the second content category specific threshold, and the second usage level exceeding the content category specific storage threshold.

* * * * *